United States Patent
Fujiwara

(10) Patent No.: US 12,286,526 B2
(45) Date of Patent: Apr. 29, 2025

(54) VINYL CHLORIDE RESIN COMPOSITION FOR POWDER MOLDING, VINYL CHLORIDE RESIN MOLDED PRODUCT, AND LAMINATE

(71) Applicant: ZEON CORPORATION, Tokyo (JP)

(72) Inventor: Takanori Fujiwara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 140 days.

(21) Appl. No.: 18/040,977

(22) PCT Filed: Aug. 13, 2021

(86) PCT No.: PCT/JP2021/029844
§ 371 (c)(1),
(2) Date: Feb. 8, 2023

(87) PCT Pub. No.: WO2022/050027
PCT Pub. Date: Mar. 10, 2022

(65) Prior Publication Data
US 2023/0265276 A1    Aug. 24, 2023

(30) Foreign Application Priority Data
Sep. 7, 2020 (JP) ................. 2020-150130

(51) Int. Cl.
| C08L 27/06 | (2006.01) |
| B32B 5/18 | (2006.01) |
| B32B 27/06 | (2006.01) |
| B32B 27/30 | (2006.01) |
| B32B 27/40 | (2006.01) |
| C08L 67/02 | (2006.01) |
| B29C 41/18 | (2006.01) |
| B29K 27/06 | (2006.01) |

(52) U.S. Cl.
CPC ............ *C08L 27/06* (2013.01); *B32B 5/18* (2013.01); *B32B 27/065* (2013.01); *B32B 27/304* (2013.01); *B32B 27/40* (2013.01); *C08L 67/02* (2013.01); *B29C 41/18* (2013.01); *B29K 2027/06* (2013.01); *B32B 2250/02* (2013.01); *B32B 2250/24* (2013.01); *B32B 2266/0278* (2013.01); *B32B 2605/003* (2013.01)

(58) Field of Classification Search
None
See application file for complete search history.

(56) References Cited

U.S. PATENT DOCUMENTS

| 2006/0025544 A1* | 2/2006 | Koube .................. C08G 63/16 525/437 |
| 2021/0395506 A1 | 12/2021 | Fujiwara |
| 2023/0073584 A1 | 3/2023 | Yamasaki et al. |

FOREIGN PATENT DOCUMENTS

| CN | 115151606 A | | 10/2022 |
| EP | 1564234 A1 | | 8/2005 |
| EP | 4116373 A1 | | 1/2023 |
| JP | S6178827 A | | 4/1986 |
| JP | 63218750 A | * | 9/1988 |
| JP | S63218750 A | | 9/1988 |
| JP | 08291243 A | * | 11/1996 |
| JP | H08291243 A | | 11/1996 |
| WO | 2020090556 A1 | | 5/2020 |
| WO | 2021176901 A1 | | 9/2021 |

OTHER PUBLICATIONS

Kurita, A., Plasticizer For Vinyl Chloride Resin, Sep. 12, 1988, machine translation of JP63218750 (Year: 1988).*
Masuda, T., Vinyl Chloride Resin Composition, Nov. 5, 1996, machine translation of JP08291243 (Year: 1996).*
Oct. 26, 2021, International Search Report issued in the International Patent Application No. PCT/JP2021/029844.
Mar. 7, 2023, International Preliminary Report on Patentability issued in the International Patent Application No. PCT/JP2021/029844.
Aug. 26, 2024, the Extended European Search Report issued by the European Patent Office in the corresponding European Patent Application No. 21864085.2.

* cited by examiner

*Primary Examiner* — Chinessa T. Golden
(74) *Attorney, Agent, or Firm* — KENJA IP LAW PC

(57) ABSTRACT

Provided is a vinyl chloride resin composition for powder molding with which it is possible to form a vinyl chloride resin molded product having excellent alcohol resistance and low-temperature flexibility. The vinyl chloride resin composition for powder molding contains: (a) a vinyl chloride resin; and (b) a 3-methyl-1,5-pentanediol-sebacic acid polyester that includes a sebacic acid-derived structural unit and a 3-methyl-1,5-pentanediol-derived structural unit. The vinyl chloride resin composition for powder molding is preferably used for powder slush molding.

8 Claims, No Drawings

VINYL CHLORIDE RESIN COMPOSITION FOR POWDER MOLDING, VINYL CHLORIDE RESIN MOLDED PRODUCT, AND LAMINATE

TECHNICAL FIELD

The present disclosure relates to a vinyl chloride resin composition for powder molding, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed of a vinyl chloride resin molded product and a laminate obtained by lining a surface skin formed of a vinyl chloride resin molded product with a foamed product such as foamed polyurethane are used in the formation of automobile interior components such as automobile instrument panels and door trims.

A vinyl chloride resin molded product that constitutes a surface skin of an automobile interior component such as an automobile instrument panel is produced, for example, by performing powder molding by a known molding method such as powder slush molding with respect to a vinyl chloride resin composition that contains a vinyl chloride resin, a plasticizer, and additives such as a pigment (for example, refer to Patent Literature (PTL) 1 and 2).

As one specific example, PTL 1 discloses the production of a laminate including a vinyl chloride resin molded product that is obtained through powder molding of a vinyl chloride resin composition for powder molding that contains a vinyl chloride resin, a trimellitic acid ester, and a polyester including an adipic acid-derived structural unit and a 3-methyl-1,5-pentanediol-derived structural unit.

In another example, PTL 2 discloses the production of a surface skin formed of a vinyl chloride resin molded product through powder slush molding of a vinyl chloride resin composition that contains vinyl chloride resin particles, a trimellitic acid ester plasticizer, and additives such as a pigment formed of a mixture of phthalocyanine blue, titanium oxide, and carbon.

CITATION LIST

Patent Literature

PTL 1: WO2020/090556A1
PTL 2: JP-H8-291243 A

SUMMARY

Technical Problem

A surface skin of an automobile interior component may be wiped with alcohol in order to maintain good sanitary conditions, and thus it is desirable for a vinyl chloride resin molded product that is used as a surface skin of an automobile interior component, or the like, to have excellent alcohol resistance.

However, there is room for improvement of the alcohol resistance of vinyl chloride resin molded products that are obtained through powder slush molding of the conventional vinyl chloride resin compositions described above.

It is also desirable for a vinyl chloride resin molded product that is obtained through powder slush molding of a vinyl chloride resin composition to have excellent low-temperature flexibility.

Accordingly, one object of the present disclosure is to provide a vinyl chloride resin composition for powder molding with which it is possible to form a vinyl chloride resin molded product having excellent alcohol resistance and low-temperature flexibility.

Another object of the present disclosure is to provide a vinyl chloride resin molded product and a laminate having excellent alcohol resistance and low-temperature flexibility.

Solution to Problem

The inventor conducted diligent investigation with the aim of solving the problems set forth above. The inventor disclosed that by powder molding a vinyl chloride resin composition for powder molding in which a sebacic acid polyester is used as a plasticizer, a vinyl chloride resin molded product having excellent alcohol resistance and low-temperature flexibility is obtained, and, in this manner, completed the present disclosure.

Specifically, the present disclosure aims to advantageously solve the problems set forth above, and a presently disclosed vinyl chloride resin composition for powder molding comprises: (a) a vinyl chloride resin; and (b) a sebacic acid polyester obtained by thin-film distillation that includes a sebacic acid-derived structural unit and a 3-methyl-1,5-pentanediol-derived structural unit and that has a 2-ethylhexanol-derived terminal structure. When a vinyl chloride resin composition for powder molding contains a sebacic acid polyester in this manner, alcohol resistance and low-temperature flexibility of a vinyl chloride resin molded product obtained through powder molding of the vinyl chloride resin composition for powder molding can be improved.

The presently disclosed vinyl chloride resin composition for powder molding preferably comprises not less than 5 parts by mass and not more than 200 parts by mass of the (b) sebacic acid polyester relative to 100 parts by mass of the (a) vinyl chloride resin. When the content of the sebacic acid polyester is within the range set forth above, alcohol resistance and low-temperature flexibility of a vinyl chloride resin molded product obtained through powder molding of the vinyl chloride resin composition for powder molding can be further increased.

The presently disclosed vinyl chloride resin composition for powder molding may further comprise (c) an additional ester other than a sebacic acid polyester. When the vinyl chloride resin composition for powder molding further contains an additional ester in this manner, powder fluidity of the vinyl chloride resin composition for powder molding can be further increased.

The presently disclosed vinyl chloride resin composition for powder molding preferably comprises not less than 5 parts by mass and not more than 99 parts by mass of the (b) sebacic acid polyester relative to 100 parts by mass of all plasticizer. When the content of the sebacic acid polyester is within the range set forth above, alcohol resistance and low-temperature flexibility of a vinyl chloride resin molded product obtained through powder molding of the vinyl chloride resin composition for powder molding can be further increased.

Moreover, the present disclosure aims to advantageously solve the problems set forth above, and a presently disclosed vinyl chloride resin molded product is obtained through powder molding (for example, powder slush molding) of any one of the vinyl chloride resin compositions for powder molding set forth above. A vinyl chloride resin molded product obtained through powder molding of the vinyl chloride resin composition for powder molding set forth above has excellent alcohol resistance and low-temperature flexibility.

The presently disclosed vinyl chloride resin molded product is preferably for a surface skin of an automobile interior component. By using the vinyl chloride resin molded product as a surface skin of an automobile interior component, it is possible to produce an automobile interior component, such as an automobile instrument panel, having low susceptibility to degradation by alcohol and high flexibility at low temperature.

Furthermore, the present disclosure aims to advantageously solve the problems set forth above, and a presently disclosed laminate comprises: a foamed polyurethane molded product; and any one of the vinyl chloride resin molded products set forth above. A laminate that includes a foamed polyurethane molded product and the vinyl chloride resin molded product set forth above can suitably be used as an automobile interior material that is used to produce an automobile interior component, such as an automobile instrument panel, having low susceptibility to degradation by alcohol and high flexibility at low temperature.

Advantageous Effect

Through the presently disclosed vinyl chloride resin composition for powder molding, it is possible to form a vinyl chloride resin molded product having excellent alcohol resistance and low-temperature flexibility.

Moreover, according to the present disclosure, it is possible to provide a vinyl chloride resin molded product and a laminate having excellent alcohol resistance and low-temperature flexibility.

DETAILED DESCRIPTION

The following provides a detailed description of embodiments of the present disclosure.

The presently disclosed vinyl chloride resin composition for powder molding can be used, for example, in powder molding of the presently disclosed vinyl chloride resin molded product. Moreover, a vinyl chloride resin molded product obtained through powder molding using the presently disclosed vinyl chloride resin composition for powder molding can suitably be used, for example, as an automobile interior material such as a surface skin included in an automobile interior component such as an automobile instrument panel or a door trim.

The presently disclosed vinyl chloride resin molded product can be used, for example, in formation of the presently disclosed laminate. Moreover, a laminate formed using the presently disclosed vinyl chloride resin molded product can suitably be used, for example, as an automobile interior material used in production of an automobile interior component such as an automobile instrument panel or a door trim.

(Vinyl Chloride Resin Composition for Powder Molding)

The presently disclosed vinyl chloride resin composition for powder molding contains: (a) a vinyl chloride resin including vinyl chloride resin particles; and (b) a sebacic acid polyester obtained by thin-film distillation that includes a sebacic acid-derived structural unit and a 3-methyl-1,5-pentanediol-derived structural unit and that has a 2-ethyl-hexanol-derived terminal structure. The presently disclosed vinyl chloride resin composition for powder molding may further contain (c) an additional ester other than a sebacic acid polyester. Moreover, the presently disclosed vinyl chloride resin composition for powder molding may optionally further contain other additives. As a result of the presently disclosed vinyl chloride resin composition for powder molding containing at least the (a) vinyl chloride resin and the (b) sebacic acid polyester described above, this composition can be used to powder mold a vinyl chloride resin molded product having excellent alcohol resistance and low-temperature flexibility. Consequently, by using the presently disclosed vinyl chloride resin composition for powder molding, it is possible to obtain a vinyl chloride resin molded product that is suitable as an automobile interior material, such as a surface skin for an automobile instrument panel or a surface skin for a door trim, having excellent alcohol resistance and low-temperature flexibility, for example.

Note that from a viewpoint of easily obtaining a vinyl chloride resin molded product that can be used well as an automobile interior material using the presently disclosed vinyl chloride resin composition for powder molding, for example, the presently disclosed vinyl chloride resin composition for powder molding is preferably used in powder slush molding.

<(a) Vinyl Chloride Resin>

A particulate vinyl chloride resin is normally used as the (a) vinyl chloride resin. The (a) vinyl chloride resin includes one type or two or more types of vinyl chloride resin particles and can optionally further include one type or two or more types of vinyl chloride resin fine particles.

Conventionally known production methods such as suspension polymerization, emulsion polymerization, solution polymerization, and bulk polymerization can be used to produce the (a) vinyl chloride resin.

In the present specification, the term "resin particles" is used to refer to particles having a particle diameter of 30 μm or more, whereas the term "resin fine particles" is used to refer to particles having a particle diameter of less than 30 μm.

Examples of the (a) vinyl chloride resin include homopolymers composed of vinyl chloride monomer units and vinyl chloride copolymers preferably comprising 50 mass % or more of vinyl chloride monomer units, and more preferably comprising 70 mass % or more of vinyl chloride monomer units. Specific examples of monomers (comonomers) that are copolymerizable with vinyl chloride monomer and can be used to form a vinyl chloride copolymer include those described in WO2016/098344A1, for example. One of these components may be used individually, or two or more of these components may be used in combination in a freely selected ratio.

<<Vinyl Chloride Resin Particles>>

In the vinyl chloride resin composition for powder molding, the vinyl chloride resin particles normally function as a matrix resin (base material). The vinyl chloride resin particles are preferably produced by suspension polymerization.

[Average Degree of Polymerization]

The average degree of polymerization of a vinyl chloride resin forming the vinyl chloride resin particles is preferably 800 or more, and more preferably 1,000 or more, and is preferably 5,000 or less, more preferably 3,000 or less, and even more preferably 2,800 or less. This is because sufficient physical strength of a vinyl chloride resin molded product formed using the vinyl chloride resin composition for powder molding can be ensured while also improving tensile characteristics (particularly tensile elongation), for example, when the average degree of polymerization of the vinyl chloride resin forming the vinyl chloride resin particles is not less than any of the lower limits set forth above. A vinyl chloride resin molded product having good tensile elongation can suitably be used as an automobile interior material, such as a surface skin of an automobile instrument panel, that has excellent ductility and that ruptures as designed without scattering of fragments when an airbag expands and is deployed, for example. Moreover, when the average degree of polymerization of the vinyl chloride resin forming the vinyl chloride resin particles is not more than the upper limit set forth above, meltability of the vinyl chloride resin composition for powder molding can be improved.

The "average degree of polymerization" referred to in the present disclosure can be measured in accordance with JIS K6720-2.

[Average Particle Diameter]

The average particle diameter of the vinyl chloride resin particles is normally 30 µm or more, preferably 50 µm or more, and more preferably 100 µm or more, and is preferably 500 µm or less, and more preferably 200 µm or less. This is because powder fluidity of the vinyl chloride resin composition for powder molding further improves when the average particle diameter of the vinyl chloride resin particles is not less than any of the lower limits set forth above. Moreover, meltability of the vinyl chloride resin composition for powder molding further improves and surface smoothness of a vinyl chloride resin molded product formed using the composition can be improved when the average particle diameter of the vinyl chloride resin particles is not more than any of the upper limits set forth above.

The "average particle diameter" referred to in the present disclosure can be measured as the volume-average particle diameter by laser diffraction in accordance with JIS Z8825.

[Proportional Content]

The proportional content of the vinyl chloride resin particles in the (a) vinyl chloride resin is preferably 70 mass % or more, and more preferably 80 mass % or more, may be 100 mass %, and is preferably 95 mass % or less, and more preferably 90 mass % or less. This is because sufficient physical strength of a vinyl chloride resin molded product formed using the vinyl chloride resin composition for powder molding can be ensured while also improving tensile elongation when the proportional content of the vinyl chloride resin particles in the (a) vinyl chloride resin is not less than any of the lower limits set forth above. Moreover, powder fluidity of the vinyl chloride resin composition for powder molding improves when the proportional content of the vinyl chloride resin particles in the (a) vinyl chloride resin is not more than any of the upper limits set forth above.

<<Vinyl Chloride Resin Fine Particles>>

In the vinyl chloride resin composition for powder molding, the vinyl chloride resin fine particles normally function as a dusting agent (powder fluidity modifier). The vinyl chloride resin fine particles are preferably produced by emulsion polymerization.

[Average Degree of Polymerization]

The average degree of polymerization of a vinyl chloride resin forming the vinyl chloride resin fine particles is preferably 500 or more, and more preferably 700 or more, and is preferably 2,000 or less, and more preferably 1,800 or less. This is because powder fluidity of the vinyl chloride resin composition for powder molding improves, and tensile elongation of a molded product obtained using the composition improves when the average degree of polymerization of the vinyl chloride resin forming the vinyl chloride resin fine particles serving as a dusting agent is not less than any of the lower limits set forth above. Moreover, meltability of the vinyl chloride resin composition for powder molding improves, and surface smoothness of a vinyl chloride resin molded product formed using the composition improves when the average degree of polymerization of the vinyl chloride resin forming the vinyl chloride resin fine particles is not more than any of the upper limits set forth above.

[Average Particle Diameter]

The average particle diameter of the vinyl chloride resin fine particles is normally less than 30 µm, preferably 10 µm or less, and more preferably 5 µm or less, and is preferably 0.1 µm or more, and more preferably 1 µm or more. This is because the vinyl chloride resin fine particles are not too small to function as a dusting agent, for example, and powder fluidity of the vinyl chloride resin composition for powder molding can be further improved when the average particle diameter of the vinyl chloride resin fine particles is not less than any of the lower limits set forth above. Moreover, when the average particle diameter of the vinyl chloride resin fine particles is not more than any of the upper limits set forth above, meltability of the vinyl chloride resin composition for powder molding further increases, and surface smoothness of a formed vinyl chloride resin molded product can be further improved.

[Proportional Content]

The proportional content of the vinyl chloride resin fine particles in the (a) vinyl chloride resin may be 0 mass %, but is preferably 5 mass % or more, and more preferably 10 mass % or more, and is preferably 30 mass % or less, and more preferably 20 mass % or less. This is because powder fluidity of the vinyl chloride resin composition for powder molding further improves when the proportional content of the vinyl chloride resin fine particles in the (a) vinyl chloride resin is not less than any of the lower limits set forth above. Moreover, physical strength of a vinyl chloride resin molded product formed using the vinyl chloride resin composition for powder molding can be further increased when the proportional content of the vinyl chloride resin fine particles in the (a) vinyl chloride resin is not more than any of the upper limits set forth above.

<(b) Sebacic Acid Polyester>

The (b) sebacic acid polyester contained in the vinyl chloride resin composition for powder molding normally functions as a plasticizer. The (b) sebacic acid polyester is a polyester obtained by thin-film distillation that includes a sebacic acid-derived structural unit and a 3-methyl-1,5-pentanediol-derived structural unit and that has a 2-ethylhexanol-derived terminal structure. Sebacic acid-derived structural units and 3-methyl-1,5-pentanediol-derived structural units are normally linked alternately in the (b) sebacic acid polyester.

Although the (b) sebacic acid polyester may include structural units other than a sebacic acid-derived structural unit and a 3-methyl-1,5-pentanediol-derived structural unit, the total of sebacic acid-derived structural units and 3-methyl-1,5-pentanediol-derived structural units is preferably 50 mass % or more of all structural units, and more preferably 80 mass % or more of all structural units. Moreover, the (b) sebacic acid polyester preferably only includes a sebacic acid-derived structural unit and a 3-methyl-1,5-pentanediol-derived structural unit as repeating units. As a result of the presently disclosed composition containing the (b) sebacic acid polyester, a vinyl chloride resin molded product that is obtained using this composition has excellent alcohol resistance and low-temperature flexibility.

The (b) sebacic acid polyester can be obtained through condensation polymerization of sebacic acid and 3-methyl-1,5-pentanediol without any specific limitations. This condensation polymerization can be performed in the presence of a catalyst. Moreover, the condensation polymerization can be performed using 2-ethylhexanol as a terminal stopping component. A product that is obtained through the condensation polymerization is subjected to after-treatment of thin-film distillation and may be further subjected to other after-treatment. Fogging characteristics improve as a result of the (b) sebacic acid polyester being obtained through thin-film distillation. Commonly known conditions can be adopted as the reaction conditions of the condensation polymerization, such as the used amounts of the monomers, the catalyst, and the terminal stopping component described above, and conditions of the thin-film distillation, such as the pressure and temperature.

Also note that a commercially available product may be used as the (b) sebacic acid polyester.

The catalyst used in the condensation polymerization reaction is not specifically limited and may be dibutyltin oxide, tetraalkyl titanate, or the like, for example.

The number-average molecular weight of the (b) sebacic acid polyester is preferably 1,000 or more, and more preferably 2,000 or more, and is preferably 10,000 or less, and more preferably 7,000 or less.

Note that the "number-average molecular weight" can be measured by VPO (vapor pressure osmometry).

Moreover, the (b) sebacic acid polyester preferably has an acid value of 1 or less.

Furthermore, the (b) sebacic acid polyester preferably has a hydroxyl value of 30 or less.

The viscosity of the (b) sebacic acid polyester is preferably 500 mPa·s or more, and more preferably 1,000 m·Pas or more, and is preferably 10,000 mPa·s or less, and more preferably 8,000 mPa·s or less.

Note that the "viscosity" can be measured in accordance with JIS Z8803 at a temperature of 23° C.

The content of the (b) sebacic acid polyester is preferably 5 parts by mass or more, more preferably 10 parts by mass or more, and even more preferably 20 parts by mass or more relative to 100 parts by mass of the (a) vinyl chloride resin, and is preferably 200 parts by mass or less, more preferably 90 parts by mass or less, and even more preferably 80 parts by mass or less relative to 100 parts by mass of the (a) vinyl chloride resin. When the content of the (b) sebacic acid polyester is not less than any of the lower limits set forth above, alcohol resistance and low-temperature flexibility of a vinyl chloride resin molded product improve. Moreover, when the content of the (b) sebacic acid polyester is not more than any of the upper limits set forth above, physical properties as a vinyl chloride resin composition for powder molding, such as powder fluidity, can be improved through the addition of an additional component, such as (c) an additional ester, to the composition, for example.

<(c) Additional Ester>

The (c) additional ester contained in the vinyl chloride resin composition for powder molding normally functions as a plasticizer. Although the (b) sebacic acid polyester improves alcohol resistance and low-temperature flexibility of a vinyl chloride resin molded product, the (b) sebacic acid polyester may reduce powder fluidity as a vinyl chloride resin composition for powder molding, and thus it is preferable to use (c) an additional ester in combination therewith in order to improve powder fluidity. The (c) additional ester is not specifically limited so long as it is an ester other than a sebacic acid polyester. For example, the (c) additional ester may be an ester compound of an aromatic carboxylic acid and a monohydric alcohol or a polyester (hereinafter, also referred to as an "additional polyester") including a structural unit derived from a dicarboxylic acid other than sebacic acid and a structural unit derived from a diol.

The ester compound of an aromatic carboxylic acid and a monohydric alcohol may, for example, be a trimellitic acid ester or a pyromellitic acid ester. The trimellitic acid ester or pyromellitic acid ester is preferably an ester compound of a monohydric alcohol with trimellitic acid or pyromellitic acid.

Specific examples of the monohydric alcohol include, but are not specifically limited to, aliphatic alcohols such as 1-hexanol, 1-heptanol, 1-octanol, 2-ethylhexanol, 1-nonanol, 1-decanol, 1-undecanol, and 1-dodecanol. Of these examples, an aliphatic alcohol having a carbon number of 6 to 18 is preferable as the monohydric alcohol, and a linear aliphatic alcohol having a carbon number of 6 to 18 is more preferable as the monohydric alcohol.

In particular, the trimellitic acid ester or pyromellitic acid ester is preferably a trimellitic acid triester or a pyromellitic acid tetraester in which substantially all of the carboxy groups of trimellitic acid or pyromellitic acid have been esterified with the monohydric alcohol described above. Alcohol residue portions of the trimellitic acid triester or pyromellitic acid tetraester may all be derived from the same alcohol or may be derived from different alcohols.

The trimellitic acid ester or pyromellitic acid ester may be formed of a single compound or may be a mixture of different compounds.

Examples of the trimellitic acid ester or pyromellitic acid ester include linear trimellitic acid esters in which alkyl groups forming the ester are linear (note that these trimellitic acid esters may be formed of a single compound or may be a mixture) such as trimethyl trimellitate, triethyl trimellitate, tri-n-propyl trimellitate, tri-n-butyl trimellitate, tri-n-pentyl trimellitate, tri-n-hexyl trimellitate, tri-n-heptyl trimellitate, tri-n-octyl trimellitate, tri-n-nonyl trimellitate, tri-n-decyl trimellitate, tri-n-undecyl trimellitate, tri-n-dodecyl trimellitate, tri-n-tridecyl trimellitate, tri-n-tetradecyl trimellitate, tri-n-pentadecyl trimellitate, tri-n-hexadecyl trimellitate, tri-n-heptadecyl trimellitate, tri-n-stearyl trimellitate, and trimellitic acid tri-n-alkyl esters (alkyl groups in a single molecule of the trimellitic acid tri-n-alkyl ester may have different carbon numbers to one another);

branched trimellitic acid esters in which alkyl groups forming the ester are branched (note that these trimellitic acid esters may be formed of a single compound or may be a mixture) such as tri-i-propyl trimellitate, tri-i-butyl trimellitate, tri-i-pentyl trimellitate, tri-i-hexyl trimellitate, tri-i-heptyl trimellitate, tri-i-octyl trimellitate, tri (2-ethylhexyl) trimellitate, tri-i-nonyl trimellitate, tri-i-decyl trimellitate, tri-i-undecyl trimellitate, tri-i-dodecyl trimellitate, tri-i-tridecyl trimellitate, tri-i-tetradecyl trimellitate, tri-i-pentadecyl trimellitate, tri-i-hexadecyl trimellitate, tri-i-heptadecyl trimellitate, tri-i-octadecyl trimellitate, and trimellitic acid trialkyl esters (alkyl groups in a single molecule of the trimellitic acid trialkyl ester may have different carbon numbers to one another);

linear pyromellitic acid esters in which alkyl groups forming the ester are linear (note that these pyromellitic acid esters may be formed of a single compound or may be a mixture) such as tetramethyl pyromellitate, tetraethyl pyromellitate, tetra-n-propyl pyromellitate, tetra-n-butyl pyromellitate, tetra-n-pentyl pyromellitate, tetra-n-hexyl pyromellitate, tetra-n-heptyl pyromellitate, tetra-n-octyl pyromellitate, tetra-n-nonyl pyromellitate, tetra-n-decyl pyromellitate, tetra-n-undecyl pyromellitate, tetra-n-dodecyl pyromellitate, tetra-n-tridecyl pyromellitate, tetra-n-tetradecyl pyromellitate, tetra-n-pentadecyl pyromellitate, tetra-n-hexadecyl pyromellitate, tetra-n-heptadecyl pyromellitate, tetra-n-stearyl pyromellitate, and pyromellitic acid tetra-n-alkyl esters (alkyl groups in a single molecule of the pyromellitic acid tetra-n-alkyl ester may have different carbon numbers to one another); and branched pyromellitic acid esters in which alkyl groups forming the ester are branched (note that these pyromellitic acid esters may be formed of a single compound or may be a mixture) such as tetra-i-propyl pyromellitate, tetra-i-butyl pyromellitate, tetra-i-pentyl pyromellitate, tetra-i-hexyl pyromellitate, tetra-i-heptyl pyromellitate, tetra-i-octyl pyromellitate, tetra(2-ethylhexyl) pyromellitate, tetra-i-nonyl pyromellitate, tetra-i-decyl pyromellitate, tetra-i-undecyl pyromellitate, tetra-i-dodecyl pyromellitate, tetra-i-tridecyl pyromellitate, tetra-i-tetradecyl pyromellitate, tetra-i-heptadecyl pyromellitate, tetra-i-octadecyl pyromellitate, and pyromellitic acid tetraalkyl esters (alkyl groups in a single molecule of the pyromellitic acid tetraalkyl ester may have different carbon numbers to one another).

The additional polyester may, for example, be a polyester that includes a structural unit derived from a dicarboxylic acid such as adipic acid or phthalic acid and a structural unit derived from a diol such as previously described.

In a case in which the vinyl chloride resin composition for powder molding contains the (c) additional ester described above, the content of the (c) additional ester is preferably 1 part by mass or more, more preferably 5 parts by mass or more, and most preferably 10 parts by mass or more relative to 100 parts by mass of the (a) vinyl chloride resin, and is preferably 200 parts by mass or less, more preferably 150 parts by mass or less, even more preferably 130 parts by mass or less, and most preferably 120 parts by mass or less relative to 100 parts by mass of the (a) vinyl chloride resin. When the content of the (c) additional ester is not less than any of the lower limits set forth above, powder fluidity of the vinyl chloride resin composition for powder molding and fogging characteristics and flexibility at low temperature of a vinyl chloride resin molded product improve. Moreover, the (c) additional ester is absorbed well by the (a) vinyl chloride resin, and powder molding properties of the vinyl chloride resin composition for powder molding improve. Furthermore, when the content of the (c) additional ester is not more than any of the upper limits set forth above, heat shrinkage resistance of a vinyl chloride resin molded product improves.

The total content of the (b) sebacic acid polyester and the (c) additional ester is preferably 30 parts by mass or more, more preferably 50 parts by mass or more, and even more preferably 80 parts by mass or more per 100 parts by mass of the vinyl chloride resin particles, and is preferably 200 parts by mass or less, more preferably 150 parts by mass or less, and even more preferably 130 parts by mass or less per 100 parts by mass of the vinyl chloride resin particles. When the total content of the (b) sebacic acid polyester and the (c) additional ester is not less than any of the lower limits set forth above, powder fluidity of the vinyl chloride resin composition for powder molding and flexibility at low temperature of a vinyl chloride resin molded product can be increased. Moreover, when the total content of the (b) sebacic acid polyester and the (c) additional ester is not more than any of the upper limits set forth above, fogging characteristics and heat shrinkage resistance can be sufficiently improved.

The content of the (b) sebacic acid polyester relative to 100 parts by mass of all plasticizer is preferably 5 parts by mass or more, more preferably 9 parts by mass or more, even more preferably 18 parts by mass or more, and particularly preferably 40 parts by mass or more, and is preferably 99 parts by mass or less, more preferably 90 parts by mass or less, and particularly preferably 80 parts by mass or less. In a case in which the vinyl chloride resin composition for powder molding contains the (c) additional ester, the content of the (b) sebacic acid polyester relative to 100 parts by mass of all plasticizer is preferably 80 parts by mass or less, more preferably 70 parts by mass or less, even more preferably 60 parts by mass or less, and particularly preferably 50 parts by mass or less. When the content of the (b) sebacic acid polyester relative to the content of all plasticizer is not less than any of the lower limits set forth above, alcohol resistance and low-temperature flexibility of a vinyl chloride resin molded product can be sufficiently increased. When the content of the (b) sebacic acid polyester relative to the content of all plasticizer is not more than any of the upper limits set forth above, powder fluidity as a vinyl chloride resin composition for powder molding can be sufficiently increased.

<Additives>

The presently disclosed vinyl chloride resin composition for powder molding may further contain various additives besides the components set forth above. Examples of additives that may be used include, but are not specifically limited to, components that can function as a plasticizer other than the previously described (b) sebacic acid polyester and (c) additional ester (for example, epoxidized vegetable oil such as epoxidized soybean oil or epoxidized linseed oil, chlorinated paraffin, butyl epoxystearate, phenyl oleate, and methyl dihydroabietate); lubricants; stabilizers such as perchloric acid-treated hydrotalcite, zeolites, β-diketones, and fatty acid metal salts; mold release agents; dusting agents other than the previously described vinyl chloride resin fine particles; impact modifiers; perchloric acid compounds other than perchloric acid-treated hydrotalcite (sodium perchlorate, potassium perchlorate, etc.); antioxidants; fungicides; flame retardants; antistatic agents; fillers; light stabilizers; foaming agents; and pigments.

Additives that are described in WO2016/098344A1, for example, can be used as the aforementioned additives that can be contained in the presently disclosed vinyl chloride resin composition for powder molding, and suitable amounts thereof may also be the same as described in WO2016/098344A1.

<Form and Physical Property Values of Vinyl Chloride Resin Composition for Powder Molding>

The presently disclosed vinyl chloride resin composition for powder molding preferably has a particulate form from a viewpoint of being suitably used in powder molding (for example, powder slush molding), and is more preferably in a dried up state with little dampness or viscosity. Such a state is indicated by the vinyl chloride resin composition for powder molding having physical property values within specific ranges indicating powder properties. Examples of such physical property values include number of seconds to fall and bulk density.

<Production Method of Vinyl Chloride Resin Composition for Powder Molding>

The presently disclosed vinyl chloride resin composition for powder molding can be produced by mixing the components described above.

Although no specific limitations are placed on the method of mixing of the (a) vinyl chloride resin, the (b) sebacic acid polyester, the (c) additional ester that is further compounded as necessary, and various additives that are further compounded as necessary, a mixing method in which the vinyl chloride resin composition for powder molding is formed as a particulate composition is preferable. Such a mixing method may, for example, be a method in which components other than a dusting agent (inclusive of vinyl chloride resin fine particles included in the (a) vinyl chloride resin) are mixed by dry blending, drying up of this mixture is caused to occur (i.e., the mixture is changed to a dry state through absorption of plasticizer by the vinyl chloride resin particles included in the (a) vinyl chloride resin), and then the dusting agent is added and mixed therewith. The dry blending can, for example, be performed using a powder mixer (for example, a high-performance flow-type mixer such as a Henschel mixer). The temperature during dry blending is not specifically limited but is preferably 50° C. or higher, and more preferably 70° C. or higher from a viewpoint of promoting absorption of other components by the vinyl chloride resin particles, and is preferably 200° C. or lower from a viewpoint of inhibiting degradation or decomposition of components of the mixture.

<Use of Vinyl Chloride Resin Composition for Powder Molding>

The obtained vinyl chloride resin composition for powder molding can be used in powder molding, and can more suitably be used in powder slush molding.

(Vinyl Chloride Resin Molded Product)

A feature of the presently disclosed vinyl chloride resin molded product is that it is obtained through powder molding of the vinyl chloride resin composition for powder molding set forth above by any powder molding method (for example, a powder slush molding method). As a result of the presently disclosed vinyl chloride resin molded product being formed using the vinyl chloride resin composition for powder molding set forth above, the presently disclosed vinyl chloride resin molded product normally contains at least the (a) vinyl chloride resin and (b) sebacic acid polyester, and has excellent alcohol resistance and low-temperature flexibility.

Therefore, the presently disclosed vinyl chloride resin molded product can suitably be used in production of a surface skin of an automobile interior component, such as an automobile instrument panel or a door trim, having excellent alcohol resistance and low-temperature flexibility.

<Formation Method of Vinyl Chloride Resin Molded Product>

Although no specific limitations are placed on the mold temperature in powder slush molding in a situation in which the vinyl chloride resin molded product is formed by powder slush molding, the mold temperature is preferably 200° C. or higher, and more preferably 220° C. or higher, and is preferably 300° C. or lower, and more preferably 280° C. or lower.

The following method, for example, may be used in production of the vinyl chloride resin molded product without any specific limitations. In this method, the presently disclosed vinyl chloride resin composition for powder molding is sprinkled onto a mold having a temperature within any of the ranges set forth above. The vinyl chloride resin composition for powder molding is initially left for not less than 5 seconds and not more than 30 seconds and, after shaking off any excess vinyl chloride resin composition for powder molding, is then further left for not less than 30 seconds and not more than 3 minutes at an arbitrary temperature. The mold is subsequently cooled to a temperature of not lower than 10° C. and not higher than 60° C., and the presently disclosed vinyl chloride resin molded product that is obtained is removed from the mold. A sheet-shaped molded product that imitates the shape of the mold is obtained.

(Laminate)

The presently disclosed laminate includes a foamed polyurethane molded product and the vinyl chloride resin molded product set forth above. The vinyl chloride resin molded product typically constitutes one surface of the laminate.

As a result of the presently disclosed laminate including a vinyl chloride resin molded product formed using the presently disclosed vinyl chloride resin composition for powder molding, the presently disclosed laminate has excellent alcohol resistance and low-temperature flexibility, for example. Therefore, the presently disclosed laminate can suitably be used as an automobile interior material forming an automobile interior component such as an automobile instrument panel or a door trim, for example.

The method by which the foamed polyurethane molded product and the vinyl chloride resin molded product are stacked is not specifically limited and may, for example, be a method such as described below. Specifically, (1) a method in which the foamed polyurethane molded product and the vinyl chloride resin molded product are separately prepared and are subsequently adhered to one another by thermal fusion bonding, thermal adhesion, or using a commonly known adhesive, or (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product may be adopted. The latter method (2) is more suitable because it involves a simple process and enables laminates of various different shapes to be obtained while easily achieving strong adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the powder properties (number of seconds to fall and bulk density) of a vinyl chloride resin composition for powder molding, and the low-temperature tensile elongation (initial, post-heating (heat aging test), and post-alcohol immersion) and loss modulus peak top temperature (initial, post-heating (heat aging test), and post-alcohol immersion) of a vinyl chloride resin molded product.

<Measurement Method of Powder Properties (Number of Seconds to Fall and Bulk Density)>

A vinyl chloride resin composition obtained in each example or comparative example was loaded into a pre-weighed 100 cc cylinder made of stainless steel from a funnel of a powder property tester (TESTER TYPE 6721 produced by Nihon Abura Shikenki Co., Ltd.) by causing the vinyl chloride resin composition to flow into the cylinder until it was overflowing and then leveling the vinyl chloride resin composition using a smooth rod. The weight of the cylinder after loading was measured, the weight of powder inside the cylinder was determined by subtracting the weight of the cylinder, and the weight of the powder was divided by 100 to calculate the bulk density (g/cm$^3$). Thereafter, the vinyl chloride resin composition that had been loaded into the cylinder was loaded into the funnel once again, and, after the entire amount thereof had been loaded, a holding plate at the bottom of the funnel was removed so as to allow the vinyl chloride resin composition to fall onto a flat plate, and the time taken for all of the vinyl chloride resin composition to fall was taken to be the number of seconds to fall. A smaller number of seconds to fall indicates that the vinyl chloride resin composition has better powder fluidity.

<Low-Temperature Tensile Elongation>

[Initial]

An obtained vinyl chloride resin molded sheet was punched out by a No. 1 Dumbbell described in JIS K6251, and then tensile breaking elongation (%) at a low temperature of –10° C. was measured in accordance with JIS K7113 at a tensing rate of 200 mm/min. A larger value for the tensile breaking elongation indicates that the vinyl chloride resin molded product has better initial (pre-heating) tensile elongation at low temperature.

[Post-Heating (Heat Aging Test)]

A laminate lined with a foamed polyurethane molded product was used as a sample. The sample was placed inside an oven and was heated in an environment having a temperature of 120° C. for 500 hours. Thereafter, the foamed polyurethane molded product was peeled from the laminate that had been heated so as to prepare just a vinyl chloride resin molded sheet. The tensile breaking elongation (%) of the vinyl chloride resin molded sheet after 500 hours of heating was then measured under the same conditions as for the initial state described above. A larger value for the tensile breaking elongation indicates that the vinyl chloride resin molded product has better post-heating (heat aging test) tensile elongation and has excellent aging resistance.

<Alcohol Resistance Test (Post-Alcohol Immersion Low-Temperature Tensile Elongation)>

An obtained vinyl chloride resin molded sheet was adjusted to 130 mm×120 mm. The vinyl chloride resin molded sheet was placed inside a 140 mm×180 mm×30 mm vessel holding 300 mL of ethanol, and then the vessel was covered. The vinyl chloride resin molded sheet was immersed at normal temperature for 3 days and was subsequently pulled out of the vessel. The vinyl chloride resin molded sheet was then air dried at normal temperature for 1 day to prepare a sample. Thereafter, the vinyl chloride resin molded sheet was punched out by a No. 1 Dumbbell and was subjected to a tensile test at –10° C. A larger value for tensile breaking elongation indicates that the vinyl chloride resin molded product has better post-alcohol immersion tensile elongation at low temperature and has excellent alcohol resistance.

<Measurement of Loss Modulus Peak Top Temperature and Evaluation of Variation Thereof>

[Initial]

The flexibility of a vinyl chloride resin molded product was evaluated by measuring a peak top temperature for the loss modulus (E") according to a dynamic viscoelasticity test (DMA) as one indicator of flexibility. Specifically, an obtained vinyl chloride resin molded sheet was punched out with dimensions of 10 mm in width by 40 mm in length to obtain a measurement sample. The peak top temperature (° C.) for the loss modulus (E") was then measured for this measurement sample in accordance with JIS K7244-4 with a frequency of 10 Hz, a heating rate of 2° C./min, and a measurement temperature range of –90° C. to +100° C. A lower peak top temperature indicates that the vinyl chloride resin molded sheet has better flexibility at low temperature.

[Post-Heating (Heat Aging Test)]

A measurement sample prepared in the same manner as for the initial state described above was placed inside an oven and was heated in an environment having a temperature of 120° C. for 500 hours. Thereafter, the foamed polyurethane molded product was peeled from the laminate that had been heated so as to prepare just a vinyl chloride resin molded sheet. The peak top temperature (° C.) for the loss modulus (E") was measured for the measurement sample of the vinyl chloride resin molded sheet after 500 hours of heating under the same conditions as for the initial state described above, and the degree of variation from the peak top temperature (° C.) for the loss modulus (E") of the measurement sample in the initial state was calculated. A smaller degree of variation indicates that the vinyl chloride resin molded sheet has better aging resistance.

[Post-Alcohol Immersion]

A measurement sample prepared in the same manner as for the initial state described above was placed inside a 140 mm×180 mm×30 mm vessel holding 300 mL of ethanol, and then the vessel was covered. The vinyl chloride resin molded sheet was immersed at normal temperature for 3 days and was subsequently pulled out of the vessel. The vinyl chloride resin molded sheet was subsequently air dried at normal temperature for 1 day to prepare a sample. Thereafter, the peak top temperature (° C.) for the loss modulus (E") was measured for this measurement sample, and the degree of variation from the peak top temperature (° C.) for the loss modulus (E") of the measurement sample in the initial state was calculated. A smaller degree of variation indicates that the vinyl chloride resin molded sheet has better alcohol resistance.

(Production Examples of Polyester Plasticizers)

Polyester plasticizers (polyesters of a dicarboxylic acid and a diol) that were used in the examples and comparative examples were produced as follows.

Adipic acid or sebacic acid as a dicarboxylic acid, 3-methyl-1,5-pentanediol as a diol, and 2-ethylhexanol as a stopper (terminal stopping component) were charged to a reactor, tetraisopropyl titanate was added as a catalyst, solvent was added as appropriate, and heating thereof was performed under stirring. Water produced as a by-product was removed at normal pressure and at reduced pressure, and a dehydration condensation reaction was caused to progress to completion. The obtained product was subjected to thin-film distillation. In this manner, polyester plasticizers A and B including 2-ethylhexoxy groups at the terminals thereof were obtained. The results are shown in Table 1.

TABLE 1

| Name of polyester plasticizer | Structure | | | Number-average molecular weight | Viscosity | Acid value | Hydroxyl value |
|---|---|---|---|---|---|---|---|
| | Dicarboxylic acid | Diol (glycol) | Terminal | | | | |
| Polyester plasticizer A | Adipic acid | 3-Methyl-1,5-pentanediol | 2-Ethylhexanol | 5,300 | 3600 mPa·s | 0.32 | 12.7 |
| Polyester plasticizer B | Sebacic acid | | | 4,300 | 3650 mPa·s | 0.44 | 11.3 |

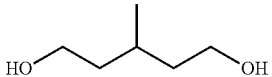

Example 1

<Production of Vinyl Chloride Resin Composition for Powder Molding>

With the exception of plasticizers (trimellitic acid ester, polyester plasticizer B, and epoxidized soybean oil (ESBO)) and vinyl chloride resin fine particles used as a dusting agent, ingredients indicated in Table 2 were loaded into and mixed in a Henschel mixer. At the point at which the temperature of the mixture rose to 80° C., all of the plasticizers were added, and drying up of the mixture was caused to occur (i.e., the mixture changed to a dry state through absorption of the plasticizers by vinyl chloride resin particles used as a vinyl chloride resin). Thereafter, once the dried-up mixture had cooled to a temperature of 70° C. or lower, the vinyl chloride resin fine particles used as the dusting agent were added to the mixture to produce a vinyl chloride resin composition.

<Production of Resin Molded Sheet for Evaluation>

The obtained vinyl chloride resin composition was sprinkled onto a textured mold that was heated to a temperature of 250° C. and, after being left to melt for an arbitrary time, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet of 145 mm×175 mm×1 mm was removed from the mold as a vinyl chloride resin molded product.

<Surface Skin/Polyurethane (PU) Laminate>

One obtained vinyl chloride resin molded sheet was placed inside a 200 mm×300 mm×10 mm mold with the textured surface facing downward.

A polyol mixture was separately obtained by mixing 50 parts of a PO (propylene oxide)/EO (ethylene oxide) block adduct of propylene glycol (hydroxyl value: 28; terminal EO unit content: 10%; internal EO unit content: 4%), 50 parts of a PO/EO block adduct of glycerin (hydroxyl value: 21; terminal EO unit content: 14%), 2.5 parts of water, 0.2 parts of an ethylene glycol solution of triethylenediamine (produced by Tosoh Corporation; product name: TEDA-L33), 1.2 parts of triethanolamine, 0.5 parts of triethylamine, and 0.5 parts of a foam stabilizer (produced by Shin-Etsu Chemical Co., Ltd.; product name: F-122). The obtained polyol mixture was mixed with polymethylene polyphenylene polyisocyanate (polymeric MDI) in a ratio determined to give an index of 98 so as to prepare a mixed liquid. The prepared mixed liquid was poured onto the vinyl chloride resin molded sheet that had been placed in the mold.

Thereafter, the mold was covered by a 348 mm×255 mm×10 mm aluminum plate from above to seal the mold. After sealing, the mold was left for 5 minutes so as to form a laminate in which a vinyl chloride resin molded sheet (thickness: 1 mm) as a surface skin was lined with a foamed polyurethane molded product (thickness: 9 mm; density: 0.2 g/cm$^3$) inside the mold.

Example 2

A vinyl chloride resin composition for powder molding, a vinyl chloride resin molded sheet, and a laminate were produced in the same way as in Example 1 with the exception that the used amounts of the polyester plasticizer B and trimellitic acid ester were changed as indicated in Table 2 (i.e., the trimellitic acid ester was not included). Measurements and evaluations were made in the same manner as in Example 1. The results are shown in Table 2.

Comparative Example 1

A vinyl chloride resin composition for powder molding, a vinyl chloride resin molded sheet, and a laminate were produced in the same way as in Example 1 with the exception that the used amounts of the polyester plasticizer B and trimellitic acid ester were changed as indicated in Table 2 (i.e., the polyester plasticizer B was not included). Measurements and evaluations were made in the same manner as in Example 1. The results are shown in Table 2.

Comparative Examples 2 and 3

A vinyl chloride resin composition for powder molding, a vinyl chloride resin molded sheet, and a laminate were produced in the same way as in Examples 1 and 2 with the exception that the polyester plasticizer A was used instead of the polyester plasticizer B as indicated in Table 2 in Comparative Examples 2 and 3. Measurements and evaluations were made in the same manner as in Example 1. The results are shown in Table 2.

TABLE 2

| | Type | | Ingredient name | Example 1 | Example 2 | Comparative Example 1 | Comparative Example 2 | Comparative Example 3 |
|---|---|---|---|---|---|---|---|---|
| Formulation [parts by mass] | Vinyl chloride resin | Vinyl chloride resin particles | ZEST® 1700ZI | 100 | 100 | 100 | 100 | 100 |
| | | | ZEST® 1300SI | | | | | |
| | | Vinyl chloride resin fine particles (dusting agent) | ZEST PQLTX | 16 | 16 | 16 | 16 | 16 |
| | | Plasticizer | TRIMEX N-08 | 50 | | 100 | 50 | |
| | | | Polyester plasticizer A | | | | 50 | 100 |
| | | | Polyester plasticizer B | 50 | 100 | 0 | | |
| | | | ADK CIZER O-130S | 5 | 5 | 5 | 5 | 5 |
| | | Stabilizer | ALCAMIZER® 5 | 4.5 | 4.5 | 4.5 | 4.5 | 4.5 |
| | | | MIZUKALIZER DS | 2.4 | 2.4 | 2.4 | 2.4 | 2.4 |
| | | | Karenz DK-1 | 0.5 | 0.5 | 0.5 | 0.5 | 0.5 |
| | | | ADK STAB LA-72 | 0.2 | 0.2 | 0.2 | 0.2 | 0.2 |
| | | | SAKAI SZ2000 | 0.2 | 0.2 | 0.2 | 0.2 | 0.2 |
| | | Mold release agent | ADK STAB LS-12 | 0.2 | 0.2 | 0.2 | 0.2 | 0.2 |
| | | Pigment | DA PX 1720(A) Black | 1.1 | 1.1 | 1.1 | 1.1 | 1.1 |
| | | | Total | 230.1 | 230.1 | 230.1 | 230.1 | 230.1 |
| Physical properties and evaluations | Tensile elongation (%) | 23° C. | Initial | 343 | 337 | 330 | 341 | 308 |
| | | −10° C. | Initial | 243 | 198 | 219 | 222 | 168 |
| | | | 500 hours | 179 | 184 | 108 | 152 | 138 |
| | | | Amount of change of low-temperature tensing (initial→500 hours) | −64 | −14 | −111 | −70 | −29 |
| | | | Proportion of change of low-temperature tensing (initial→500 hours) | −26% | −7% | −51% | −32% | −18% |
| | | | 3 days ethanol immersion | 125 | 152 | 30 | 104 | 110 |
| | DMA | Initial | E" peak top temperature [° C.] | −36 | −29 | −43 | −33 | −26 |
| | | After 3 days of ethanol extraction | E" peak top temperature [° C.] | −25 | −23 | 38 | −20 | −23 |
| | | | Amount of change from initial | 11 | 5 | 80 | 14 | 3 |
| | | | Proportion of change from initial | −31% | −19% | −189% | −41% | −10% |
| | | 120° C. × 500 hours | E" peak top temperature [° C.] | −23 | −25 | −23 | −17 | −20 |
| | | | Amount of change from initial | 13 | 4 | 19 | 16 | 6 |
| | | | Proportion of change from initial | −36% | −13% | −45% | −49% | −24% |
| | Powder properties | | Number of seconds to fall | 13.1 | 20.3 | 15.2 | 15.4 | 13.7 |
| | | | Bulk density | 0.58 | 0.58 | 0.57 | 0.58 | 0.58 |

Details of ingredients indicated by product names in the table are as follows.

<Vinyl Chloride Resin Particles>

ZEST® (ZEST is a registered trademark in Japan, other countries, or both) 1700ZI (producer: Shin Dai-ichi Vinyl Corporation): Vinyl chloride resin (suspension polymerization; average particle diameter: 129 μm; degree of polymerization: 1,700)

ZEST® 1300SI (producer: Shin Dai-ichi Vinyl Corporation): Vinyl chloride resin (suspension polymerization; average particle diameter: 132 μm; degree of polymerization: 1,300)

<Vinyl Chloride Resin Fine Particles (Dusting Agent)>

ZEST PQLTX (producer: Shin Dai-ichi Vinyl Corporation): Vinyl chloride resin (emulsion polymerization; average particle diameter: 1.8 μm; degree of polymerization: 800)

<Plasticizers>

TRIMEX N-08 (producer: Kao Corporation): Trimellitate plasticizer (n-C8,C10 trimellitic acid ester)

ADK CIZER O-130S (producer: Adeka Corporation): Epoxidized soybean oil (ESBO)

<Stabilizers>

ALCAMIZER® (ALCAMIZER is a registered trademark in Japan, other countries, or both) 5 (producer: Kyowa Chemical Industry Co., Ltd.): Partial perchlorate uptake-type hydrotalcite (90% C104 HDT)

MIZUKALIZER DS (producer: Mizusawa Industrial Chemicals, Ltd.): Na-Zeolite

Karenz DK-1 (producer: Showa Denko K.K.): β-Diketone

ADK STAB LA-72 (producer: Adeka Corporation): Hindered amine light stabilizer (HALS)

SAKAI SZ2000 (producer: Sakai Chemical Industry Co., Ltd.): Zinc stearate

<Mold Release Agent>

ADK STAB LS-12 (producer: Adeka Corporation): 12-Hydroxystearic acid

<Pigment>

DA PX 1720 (A) Black (producer: Dainichiseika Color and Chemicals Mfg. Co., Ltd.): Colorant It can be seen from Table 2 that tensile elongation after 3 days of alcohol immersion and after 500 hours of heating is higher for a vinyl chloride resin molded product in which the polyester plasticizer B (sebacic acid polyester) is used as a plasticizer (Examples 1 and 2) compared to a vinyl chloride resin molded product that does not contain the polyester plasticizer B (Comparative Example 1) and a vinyl chloride resin molded product in which the polyester plasticizer A (adipic acid polyester) is used as a plasticizer (Comparative Examples 2 and 3). This demonstrates that a vinyl chloride resin molded product in which a sebacic acid polyester is used as a plasticizer has excellent alcohol resistance compared to a vinyl chloride resin molded product in which an adipic acid polyester is used as a plasticizer.

It can also be seen that a low peak top temperature for the loss modulus (E") was obtained in Examples 1 and 2, which demonstrates that a vinyl chloride resin molded product in which a sebacic acid polyester is used as a plasticizer has excellent low-temperature flexibility.

It can also be seen that there was little variation of the peak top temperature for the loss modulus (E") after 3 days of alcohol immersion and after 500 hours of heating in Examples 1 and 2, which demonstrates that a vinyl chloride resin molded product in which a sebacic acid polyester is used as a plasticizer has excellent low-temperature flexibility.

Example 3

A vinyl chloride resin composition for powder molding, a vinyl chloride resin molded sheet, and a laminate were produced in the same way as in Example 1 with the exception that the used amounts of the polyester plasticizer B and trimellitic acid ester and the type of vinyl chloride resin particles were changed as indicated in Table 3. Measurements and evaluations were made in the same manner as in Example 1. The results are shown in Table 3.

Comparative Example 4

A vinyl chloride resin composition for powder molding, a vinyl chloride resin molded sheet, and a laminate were produced in the same way as in Example 3 with the exception that the polyester plasticizer A was used instead of the polyester plasticizer B as indicated in Table 3. Measurements and evaluations were made in the same manner as in Example 1. The results are shown in Table 3.

TABLE 3

| | Type | | Ingredient name | Example 3 | Comparative Example 4 |
|---|---|---|---|---|---|
| Formulation [parts by mass] | Vinyl chloride resin | Vinyl chloride resin particles | ZEST ® 1700ZI | 100 | 100 |
| | | | ZEST ® 1300SI | | |
| | | Vinyl chloride resin fine particles (dusting agent) | ZEST PQLTX | 16 | 16 |
| | | Plasticizer | TRIMEX N-08 | 60 | 60 |
| | | | Polyester plasticizer A | | 60 |
| | | | Polyester plasticizer B | 60 | |
| | | | ADK CIZER O-130S | 5 | 5 |
| | | Stabilizer | ALCAMIZER ® 5 | 4.5 | 4.5 |
| | | | MIZUKALIZER DS | 2.4 | 2.4 |
| | | | Karenz DK-1 | 0.5 | 0.5 |
| | | | ADK STAB LA-72 | 0.2 | 0.2 |
| | | | SAKAI SZ2000 | 0.2 | 0.2 |
| | | Mold release agent | ADK STAB LS-12 | 0.2 | 0.2 |
| | | Pigment | DA PX 1720(A) Black | 1.1 | 1.1 |
| | | Total | | 250.1 | 250.1 |
| Physical properties and evaluations | Tensile elongation (%) | 23° C. | Initial | 379 | 376 |
| | | −10° C. | Initial | 268 | 266 |
| | | | 500 hours | 206 | 190 |
| | | | Amount of change of low-temperature tensing (initial->500 hours) | −62 | −76 |
| | | | Proportion of change of low-temperature tensing (initial->500 hours) | −23% | −28% |
| | | | 3 days ethanol immersion | 165 | 134 |
| | DMA | Initial | E" peak top temperature [°C] | −42 | −41 |
| | | After 3 days of ethanol extraction | E" peak top temperature [°C] | −31 | −29 |
| | | | Amount of change from initial | 11 | 12 |
| | | | Proportion of change from initial | −26% | −29% |
| | | 120° C. × 500 hours | E" peak top temperature [C] | −30 | −26 |
| | | | Amount of change from initial | 12 | 15 |
| | | | Proportion of change from initial | −29% | −36% |
| | Powder properties | | Number of seconds to fall | 12.9 | 14.0 |
| | | | Bulk density | 0.58 | 0.56 |

It can be seen from Table 3 that even in a case in which the total amount of plasticizer and the type of vinyl chloride resin particles differ from those in the case of Table 2, a vinyl chloride resin molded product in which the polyester plasticizer B (sebacic acid polyester) is used as a plasticizer (Example 3) has high tensile elongation after 3 days of alcohol immersion and after 500 hours of heating compared to a vinyl chloride resin molded product in which the polyester plasticizer A (adipic acid polyester) is used as a plasticizer (Comparative Example 4). This demonstrates that a vinyl chloride resin molded product in which a sebacic acid polyester is used as a plasticizer has excellent alcohol resistance compared to a vinyl chloride resin molded product in which an adipic acid polyester is used as a plasticizer regardless of the total amount of plasticizer and the type of vinyl chloride resin particles.

It can also be seen that a low peak top temperature for the loss modulus (E″) was obtained in Example 3, which demonstrates that a vinyl chloride resin molded product in which a sebacic acid polyester is used as a plasticizer has excellent low-temperature flexibility regardless of the total amount of plasticizer and the type of vinyl chloride resin particles.

Examples 4 and 5

A vinyl chloride resin composition for powder molding, a vinyl chloride resin molded sheet, and a laminate were produced in the same way as in Example 1 with the exception that the used amounts of the polyester plasticizer B and trimellitic acid ester were changed as indicated in Table 4. Measurements and evaluations were made in the same manner as in Example 1. The results are shown in Table 4 together with those for Examples 1 and 2 and Comparative Example 1.

TABLE 4

| | Type | | Ingredient name | Comparative Example 1 | Example 4 | Example 5 | Example 1 | Example 2 |
|---|---|---|---|---|---|---|---|---|
| Formulation [parts by mass] | Vinyl chloride resin | Vinyl chloride resin particles | ZEST ® 1700ZI ZEST ® 1300SI | 100 | 100 | 100 | 100 | 100 |
| | | Vinyl chloride resin fine particles (dusting agent) | ZEST PQLTX | 16 | 16 | 16 | 16 | 16 |
| | | Plasticizer | TRIMEX N-08 | 100 | 90 | 80 | 50 | |
| | | | Polyester plasticizer A | | | | | |
| | | | Polyester plasticizer B | 0 | 10 | 20 | 50 | 100 |
| | | | ADK CIZER O-130S | 5 | 5 | 5 | 5 | 5 |
| | | Stabilizer | ALCAMIZER ® 5 | 4.5 | 4.5 | 4.5 | 4.5 | 4.5 |
| | | | MIZUK ALIZER DS | 2.4 | 2.4 | 2.4 | 2.4 | 2.4 |
| | | | Karenz DK-1 | 0.5 | 0.5 | 0.5 | 0.5 | 0.5 |
| | | | ADK STAB LA-72 | 0.2 | 0.2 | 0.2 | 0.2 | 0.2 |
| | | | SAKAI SZ2000 | 0.2 | 0.2 | 0.2 | 0.2 | 0.2 |
| | | Mold release agent | ADK STAB LS-12 | 0.2 | 0.2 | 0.2 | 0.2 | 0.2 |
| | | Pigment | DA PX 1720(A) Black | 1.1 | 1.1 | 1.1 | 1.1 | 1.1 |
| | | | Total | 230.1 | 230.1 | 230.1 | 230.1 | 230.1 |
| Physical properties and evaluations | Tensile elongation (%) | 23° C. | Initial | 330 | 336 | 338 | 343 | 337 |
| | | −10° C. | Initial | 219 | 214 | 209 | 243 | 198 |
| | | | 500 hours | 108 | 117 | 119 | 179 | 184 |
| | | | Amount of change of low-temperature tensing (initial→500 hours) | −111 | −97 | −91 | −64 | −14 |
| | | | Proportion of change of low-temperature tensing (initial→500 hours) | −51% | −45% | −43% | −26% | −7% |
| | | | 3 days ethanol immersion | 30 | 64 | 92 | 125 | 152 |
| | DMA | Initial | E″ peak top temperature [° C.] | −43 | −41 | −41 | −36 | −29 |
| | | After 3 days of ethanol extraction | E″ peak top temperature [° C.] | 38 | −26 | −29 | −25 | −23 |
| | | | Amount of change from initial | 80 | 15 | 12 | 11 | 5 |
| | | | Proportion of change from initial | −189% | −37% | −29% | −31% | −19% |
| | | 120° C. × 500 hours | E″ peak top temperature [° C.] | −23 | −22 | −22 | −23 | −25 |
| | | | Amount of change from initial | 19 | 19 | 19 | 13 | 4 |
| | | | Proportion of change from initial | −45% | −47% | −46% | −36% | −13% |
| | Powder properties | | Number of seconds to fall | 15.2 | 14.1 | 14.0 | 13.1 | 20.3 |
| | | | Bulk density | 0.57 | 0.57 | 0.57 | 0.58 | 0.58 | onstrates that a vinyl chloride resin molded product in which a sebacic acid polyester is used as a plasticizer has excellent low-temperature flexibility regardless of the total amount of plasticizer and the type of vinyl chloride resin particles. It can also be seen that there was little variation of the peak top temperature for the loss modulus (E″) after 3 days of alcohol immersion and after 500 hours of heating in Example 3, which demonstrates that a vinyl chloride resin molded product in which a sebacic acid polyester is used as a plasticizer has excellent low-temperature flexibility regardless of the total amount of plasticizer and the type of vinyl chloride resin particles.

It can be seen through comparison of Examples 1, 2, 4, and 5 and Comparative Example 1 in Table 4 that the degree to which low-temperature tensile elongation decreases after 3 days of alcohol immersion and after 500 hours of heating relative to low-temperature tensile elongation in an initial state is suppressed as the content ratio of a sebacic acid polyester increases. This demonstrates that as the content ratio of a sebacic acid polyester increases, low-temperature tensile elongation is better maintained after 3 days of alcohol immersion and after 500 hours of heating, and alcohol resistance and low-temperature flexibility improve. It can also be seen that the number of seconds to fall for a composition (powder) increases with increasing content ratio of a trimellitate plasticizer, which indicates that increasing the content ratio of an ester component other than a sebacic acid polyester improves powder fluidity of a composition.

INDUSTRIAL APPLICABILITY

Through the presently disclosed vinyl chloride resin composition for powder molding, it is possible to form a vinyl chloride resin molded product having excellent alcohol resistance and low-temperature flexibility.

Moreover, according to the present disclosure, it is possible to provide a vinyl chloride resin molded product and a laminate having excellent alcohol resistance and low-temperature flexibility.

The invention claimed is:

1. A vinyl chloride resin composition for powder molding comprising:
   (a) a vinyl chloride resin; and
   (b) a sebacic acid polyester obtained by thin-film distillation consisting of a sebacic acid-derived structural unit, a 3-methyl-1,5-pentanediol-derived structural unit and a 2-ethylhexanol-derived terminal structure,
   wherein the (a) vinyl chloride resin comprises vinyl chloride resin particles having a particle diameter of 30 μm or more and vinyl chloride resin fine particles having a particle diameter of less than 30 μm.

2. The vinyl chloride resin composition for powder molding according to claim 1, comprising not less than 5 parts by mass and not more than 200 parts by mass of the (b) sebacic acid polyester relative to 100 parts by mass of the (a) vinyl chloride resin.

3. The vinyl chloride resin composition for powder molding according to claim 1, further comprising (c) an additional ester other than a sebacic acid polyester.

4. The vinyl chloride resin composition for powder molding according to claim 1, comprising not less than 5 parts by mass and not more than 99 parts by mass of the (b) sebacic acid polyester relative to 100 parts by mass of all plasticizer.

5. A vinyl chloride resin molded product obtained through powder slush molding of the vinyl chloride resin composition for powder molding according to claim 1.

6. The vinyl chloride resin molded product according to claim 5, used for an automobile instrument panel.

7. A laminate obtained through stacking of the vinyl chloride resin molded product according to claim 5 and foamed polyurethane.

8. The laminate according to claim 7, used for an automobile instrument panel.

* * * * *